United States Patent [19]

Mard et al.

[11] Patent Number: 4,920,306

[45] Date of Patent: Apr. 24, 1990

[54] METHOD FOR CONTROLLING THE TORQUE OF A SYNCHRONOUS MACHINE SUPPLIED BY A FREQUENCY CONVERTER

[75] Inventors: Matti Mard, Kauniainen; Vesa Vauhkonen, Helsinki; Olavi Kangasaho, Kauniainen, all of Finland

[73] Assignee: ABB Stromberg Drives OY, Helsinki, Finland

[21] Appl. No.: 227,775

[22] Filed: Aug. 3, 1988

[30] Foreign Application Priority Data

Aug. 7, 1987 [FI] Finland ................................. 873433

[51] Int. Cl.$^5$ .......................................... H02P 5/40
[52] U.S. Cl. .................................... 318/722; 318/800
[58] Field of Search ............... 318/722, 723, 805, 800, 318/807–811

[56] References Cited

U.S. PATENT DOCUMENTS 4,649,331 3/1987 Janns .................................... 318/723
4,792,741 12/1988 Matsuo et al. ....................... 318/723

OTHER PUBLICATIONS

Leonhard, W, *Control of Electrical Drives*, Springer-Verlag, 1985, pp. 261-270.
Mard, M.; Control Laws of Electric Machines; IFAC Control in Power Electronics and Electrical Drives; Lausanne, Switzerland; pp. 33–40 (1981).

*Primary Examiner*—David Smith, Jr.
*Attorney, Agent, or Firm*—Watson, Cole, Grindle & Watson

[57] ABSTRACT

This invention relates to a method for controlling the torque of a synchronous machine supplied by a frequency converter, wherein starting from measured variables ($i_R$, $i_S$, $i_T$, $i_f$) representing the state of the machine the direct axis flux component ($\psi_d$), the quadrature axis flux component ($\psi_q$) and the pole angle ($\delta$) for the machine are determined, and set values are produced for the flux ($\psi$ set value), excitation current ($i_{fo}$ set value) and current building the torque ($i_2$ set value). To prevent the "pull out" of the drive in the method of the invention, from the determined pole angle ($\delta$) there is formed, by means of a limiting block for the pole angle, a limited pole angle ($\delta_r$) that equals the pole angle ($\delta$) if the pole angle has an absolute value smaller than a separately adjustable limit ($\delta_{max}$), but equals the limit ($\delta_{max}$) if the pole angle has an absolute value equal to or greater than the limit ($\delta_{max}$), the set value ($i_2$ set value) of the current building the torque, being perpendicular to the direction forming the limited pole angle ($\delta_r$) with the direct axis (d) of the rotor, is projected as the set value ($i_{do}$ set value) for the direct stator current and as the set value for the quadrature stator current ($i_{qo}$ set value) and for maintaining the direct flux ($\psi_d$) at a value corresponding to the limited pole angle ($\delta_r$) and the flux set value ($\psi$ set value), the set value ($i_{fo}$ set value) for the excitation current is calculated on the basis of the limited pole angle ($\delta_r$), the flux set value ($\psi$set value) and the set value for the direct stator current ($i_{do}$ set value) so that the set value for the excitation current ($i_{fo}$ set value) compensates for the direct stator set value ($i_{do}$ set value).

7 Claims, 3 Drawing Sheets

METHOD FOR CONTROLLING THE TORQUE OF A SYNCHRONOUS MACHINE SUPPLIED BY A FREQUENCY CONVERTER

BACKGROUND OF THE INVENTION

The present invention relates to a method for controlling the torque of a synchronous machine supplied by a frequency converter. In this method, starting from measured variables representing the state of the machine, the direct axis flux component, the quadrature axis flux component and the pole angle for the machine are determined, and set values are produced for the flux, excitation current and current controlling the torque.

The frequency-controlled drive of a synchronous machine requires a rapidly adjustable frequency converter as well as control dependent on the pole angle and the position of the rotor and ultimately adjusting the main flux. The oldest of such systems from the 1960's are so called characteristic curve-controlled systems (Stemmler, H., Antriebssystem and elektronische Regeleinrichtung der getriebelosen Rohrmühle. Brown Boveri Mitteilungen 57, H. 73, pp. 121-129 (1970)) wherein stator and rotor magnets are controlled by adjusting, by means of characteristic curves stored in function generators, the magnetic currents and the angles therebetween to such values as allow for a drive with a constant flux and the desired power ratio with all permissible loads. Such rotor oriented drives operating in the polar coordinates already represented a rather successful control principle, but the adjustment dynamics achieved therewith was not sufficient in view of sophisticated drives (e.g. rolling mill drives), since the control was specifically based on the characteristic curves of the constant state of the synchronous machine.

The controllability of the synchronous machine was improved, when starting from the beginning of the 1970's the so called vector-controlled field oriented control procedure was applied (Blaschke, F., Das Verfahren der Feldorientierung zur Regelung der Drehfeldmaschine. TU Braunschweig, 1974 (dissertation)). In flux orientation, the stator magnet is controlled either in the direction of the main flux (dynamic flux control) or perpendicularly to the main flux (torque control/adjustment on the torque axis). Rotor current control dependent on the stator current is often added to the flux-oriented control procedure, but the method and precision of calculating the set value for the current in relation to the set values for the stator currents varies in different applications (Bühler, H., Einführung in die Theorie geregelter Drehstromantriebe. Birkhäuser Verlag Basel und Stuttgart, 1977).

The basic disadvantage of the known methods resides in that they allow the pole angle to be formed freely. Furthermore, they utilize in a static synchronous machine not furnished with a damper winding the so called synchronizing torque (torque variation relative to variation of pole angle) also in dynamic torque control. With large pole angles, the synchronizing torque is decreased, which may result in the "pull out" of the drive into the pure reactive current state when the pole angle exceeds the value 90°. The practicability of these methods has been improved by means of a damper winding partially separating the dynamic torque control and the pole angle control from one another.

SUMMARY OF THE INVENTION

In the system according to the invention, one operates in the coordinates of the rotor, and the possibility for the precise load adjustment of the synchronous machine afforded by the rotor current in combination with the direct axis stator current is bilaterally utilized; for this the so called law of armature control (Mard, M., Control Laws of Electric Machines. IFAC Control in Power Electronics and Electrical Drives, Lausanne, Switzerland, 1981, pp. 33-40) affords full possibility. Simultaneously, the torque control may be relieved from controlling the pole angle, and the pole angle may be separately adjusted to have a value best suited to the circumstances of use.

For the realization of the aforesaid, the method of the invention is characterized in that the pole angle is directed to a pole angle limiting block, forming a limited pole angle that equals the pole angle if the pole angle has an absolute value smaller than a separately adjustable limit, but equals the limit if the pole angle has an absolute value equal to or greater than the limit, that the set value for the current controlling the torque, being perpendicular to the direction forming the limited pole angle with the direct axis of the rotor, is projected as the set value for the direct axis stator current and for the quadrature stator current and that for maintaining the direct flux at a value corresponding to the limited pole angle and the flux set value, the set value for the excitation current is calculated on the basis of the limited pole angle, the flux set value and the set value for the direct axis stator current so that the set value for the excitation current compensates for the direct axis stator set value.

In order not to exceed the highest allowable value for the pole angle, the set value for the quadrature stator current is limited to that quadrature current value which in the stationary state generates a quadrature flux corresponding to the flux set value and the highest allowable pole angle in the machine, i.e. the set value is not allowed to exceed said value. When a synchronous machine furnished with a damper winding is used, one can proceed in such a way that the set value for the quadrature stator current is limited to that quadrature current value which together with the calculated quadrature damper winding current generates a quadrature flux corresponding to the flux set value and the highest allowable pole angle in the machine.

Alternatively to the above embodiment of the present method, one may also proceed in such a way that the pole angle of the machine is controlled to have a fixed (but freely selectable) value, that the set value for the current controlling the torque, being perpendicular to the direction forming said fixed pole angle with the direct axis of the rotor, is projected as the set value for the direct axis stator current and for the quadrature stator current, that the set value for the quadrature stator current is adjusted to have a value corresponding to the quadrature flux obtained on the basis of the flux set value and the said fixed pole angle, and for maintaining the direct axis flux at a value corresponding to said fixed pole angle and flux set value, the set value for the excitation current is calculated on the basis of said fixed pole angle, the flux set value and the set value for the direct axis stator current, so that the set value for the excitation current compensates for the set value for the direct axis stator current.

BRIEF DESCRIPTION OF THE DRAWINGS

The following is a more detailed description of the invention with reference to the accompanying drawing wherein.

DESCRIPTION OF THE PREFERRED EMBODIMENTS

Figure 1:
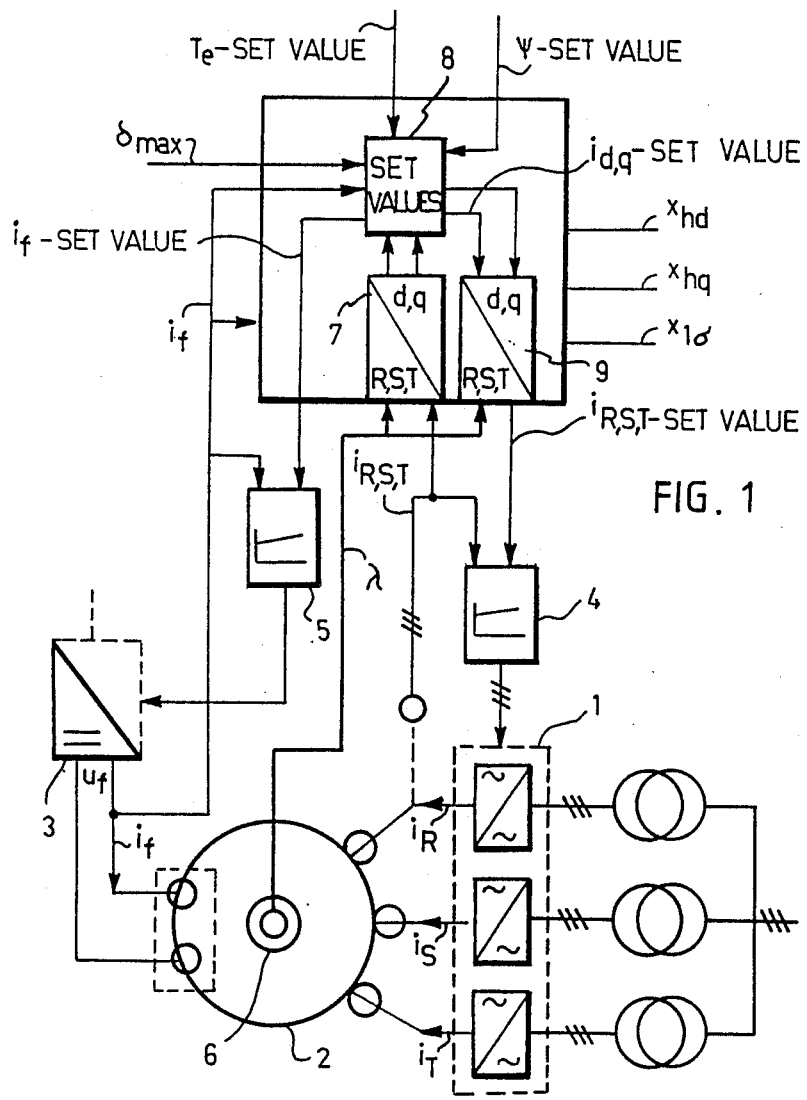
FIG. 1 shows a system comprising a synchronous machine and a frequency converter for carrying out the present invention.

FIG. 1 shows a system comprising a synchronous machine and a frequency converter, to the control of which the method of the invention relates.

The frequency converter 1 shown in the Figure may be a cycloconverter (direct frequency converter) or an inverter (frequency converter with an intermediate circuit).

The machine 2 is a synchronous machine which may have salient or non-salient poles and in which the excitation current for the rotor is derived from a separate controllable converter 3. The synchronous machine may be of the brush type or brushless type.

The following is a simplified presentation of the control system for the synchronous machine and for the frequency converter supplying the synchronous machine:

- The phase currents $i_R$, $i_S$ and $i_T$ of the synchronous machine are controlled by means of current regulators 4, the actual value for which is measured with a current transducer from the stator and the set value for which is obtained by the method more closely defined by the invention. The current control loop determines the instantaneous value for the frequency converter voltage.
- The excitation current $i_f$ for the synchronous machine is controlled by a current regulator 5, the actual value for which is measured with a current transformer from the excitation current circuit and the set value ($i_f$ set value) for which is also obtained by the method more closely defined by the invention.
- The outermost control/regulating loops of the drive determine the set value for the torque of the drive ($T_e$ set value) which is utilized by the system of the invention in the manner stated hereinbelow to control the converter and the machine.

Figure 2:
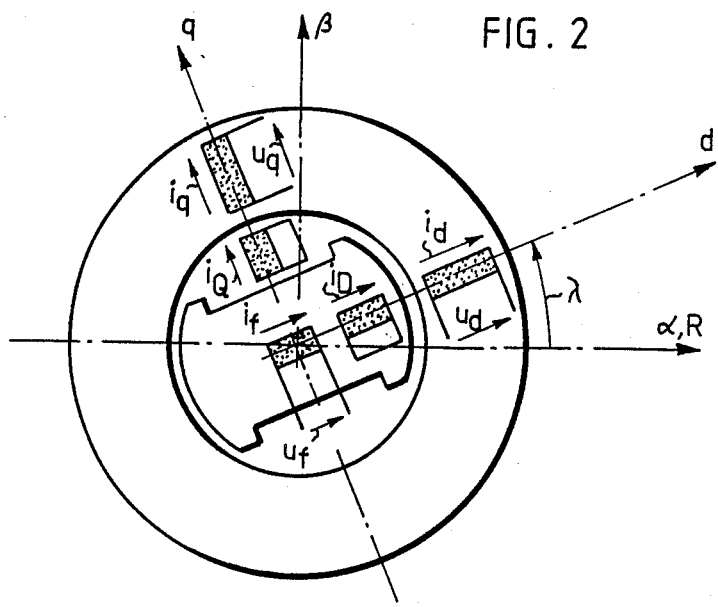
FIG. 2 is a schematic representation of the stator and rotor of the synchronous machine and the coordinate systems pertaining thereto.

The system includes a detector 6 for the position of the rotor of the machine or information on the position of the rotor retrieved in another manner. The measured instantaneous values $i_R$, $i_S$, $i_T$ of the stator currents are converted to instantaneous values of currents id and iq in the rotor coordinates in block 7. The d axis of the coordinates has the direction of the magnetic axis of the rotor and the q axis is perpendicular thereto, FIG. 2. The d axis of the rotor coordinates (d, q) forms an angle $\lambda$ with the $\alpha$ axis of the stator coordinates ($\alpha,\beta$). The $\alpha$ axis of the stator coordinates coincides with the magnetic R axis of the machine, and the $\beta$ axis is perpendicular thereto. The magnetic axes R, S, T of the machine are at a 120° phase displacement angle.

From the R, S, T coordinates we change over to the $\alpha$, $\beta$ coordinates by means of coordinate transformation equations which for the currents are the following:

$$i_\alpha = i_R - \frac{1}{2} \cdot i_S - \frac{1}{2} i_T \quad (1)$$

$$i_\beta = \frac{1}{\sqrt{3}} (i_S - i_T)$$

From the $\alpha,\beta$ coordinates we change over to the d, q coordinates by means of transformation equations which for the currents are the following:

$$id = i_\alpha \cdot \cos \lambda + i_\beta \cdot \sin \mu$$

$$iq = -i_\alpha \cdot \sin \lambda + i_\beta \cdot \cos \mu \quad (2)$$

The angle $\lambda$ is as hereinbefore defined and is measured with a position angle detector 6 disposed on the shaft of the machine or by other equivalent means.

The system includes a flux model (FIG. 3, FIG. 1, block 8) wherein the direct and quadrature fluxes $\psi d$ and $\psi q$, the pole angle $\delta$ and the damper winding currents $i_{2D}$ and $i_{2Q}$ for the machine are calculated on the basis of the currents $i_d$, $i_q$ and the measured excitation current $i_f$ as follows:

$$\psi d = X_{hd}(i_f + i_{2D}) + (X_{hd} + X_{1\sigma})id \quad (3)$$

$$\psi q = X_{hq} i_{2Q} + (X_{1\sigma} + X_{hq})iq \quad (4)$$

The reactances $X_{hd}$ and $X_{hq}$ in the equations are the direct and quadrature main reactances of the machine respectively, $X_{2D}$ and $X_{2Q}$ are the direct and quadrature stray reactances of the damper winding respectively, and $X_{1\delta}$ is the stray reactance of the stator.

The reactances in the equations may be functions of magnetic saturation or constants.

If the control/regulation relates to the air gap flux, $X_{1\delta}$ in equations (3) and (4) shall be entered as 0.

The damper winding currents $i_{2D}$ and $i_{2Q}$ for the machine are calculated from the equations $$i_{2D} = k_{td}(i_d + i_f)\left(-1 + \frac{1}{1 + sT_D}\right) \quad (5)$$

$$i_{2Q} = k_{tq} \cdot i_q \left(-1 + \frac{1}{1 + sT_Q}\right) \quad (6)$$

The equations are derived by means of the Laplace transform from the general voltage and flux equations according to the 2-axis theory for the synchronous machine.

In these equations, s is the Laplace variable. The coefficients $k_{td}$, $K_{tq}$ are follows:

$$k_{td} = \frac{X_{hd}}{X_{hd} + X_{2D}} \quad (7)$$

$$k_{tq} = \frac{X_{hq}}{X_{hq} + X_{2Q}} \quad (8)$$

The time constants $T_D$ and $T_Q$ are as follows:

$$T_D = \frac{X_{hd} + X_{2D}}{\omega N \cdot r_{2D}} \quad (9)$$

$$T_Q = \frac{X_{hq} + X_{2Q}}{\omega N \cdot r_{2Q}} \tag{10}$$

In these equations $\omega$ = electrical rated angle speed of the machine $r_{2D}$ = direct axis resistance of the damper winding $r_{2Q}$ = quadrature resistance of the damper winding The pole angle for the machine is determined by means of the equation $$\delta = \arctan\frac{\psi_q}{\psi_d} \tag{11}$$

and the flux for the machine is determined by means of the equation $$\psi = \sqrt{\psi_d^2 + \psi_q^2} \tag{12}$$

The set values for the stator currents ($i_d$ set value and $i_q$ set value) formed as stated hereinafter according to the invention are transformed into the R-S-T coordinates (FIG. 1, block 9) of the stator via the coordinates $\alpha$, $\beta$ of the stator. The method is inverse to the R-S-T-dq transform presented at the beginning of the general description.

In brief, the invention operates in the following manner:

A current set value ($i_2$ set value) is formed of the torque set value derived from the control/regulation of the drive by means of the equation $$i_2 \text{ set value} = \frac{Te \text{ set value}}{\psi}$$

wherein the flux $\psi'$ may be the $\psi$ set value, $\psi$ or 1. The flux set value ($\psi$ set value) is formed so as to correspond to the desired voltage and frequency.

In conventional flux orientation (e.g. German Patent No. 21 32 178), this current set value and the $i_2$ set value are maintained perpendicular to the flux indicator $\psi$. In that case, a torque variation always involves a pole angle variation (synchronizing torque). With large pole angles, the synchronizing torque is decreased, and if the value of the pole angle is close to 90° (high stator currents, low fluxes in the field weakening) and an attempt is made to increase the torque ($i_2$ set value), the synchronous machine will "pull out" into the pure reactive current state as the value of the pole angle exceeds 90° and the quadrature flux disappears. On the other hand, in the regulating procedure of the present invention the pole angle control may be separated from the torque control, either in such a manner that the pole angle is controlled fully independently of the torque control, or in such a manner that the pole angle is limited upon the increase of the load to have a safe value in view of pole angle "pull out". Furthermore, the invention is characterized in that the current set values are formed in the rotor coordinates, which makes possible the precise control of the fluxes and currents in the direction of the d and q axes and the utilizing of the motor parameters.

When the machine is driven at a certain (constant) pole angle $\delta_o$, the following equation can be written for the direct axis flux (FIG. 4):

$$\psi_d = \psi \cdot \cos\delta_r = X_{hd} \cdot i_{f0} + (X_{hd} + X_{1\sigma}) \cdot i_{d0}$$

(If the control/regulation is based on the air gap flux, $X_{1\delta}$ in the above equation shall be entered as 0.)

From this equation, we have for the compensated $i_{f0}$ control:

$$i_{f0}\text{set value} = \tag{14}$$

$$\frac{\psi \text{ set value} \cdot \cos\delta_r - (X_{hd} + X_{1\sigma}) \cdot i_{d0}\text{set value}}{X_{hd}}$$

Figure 4:
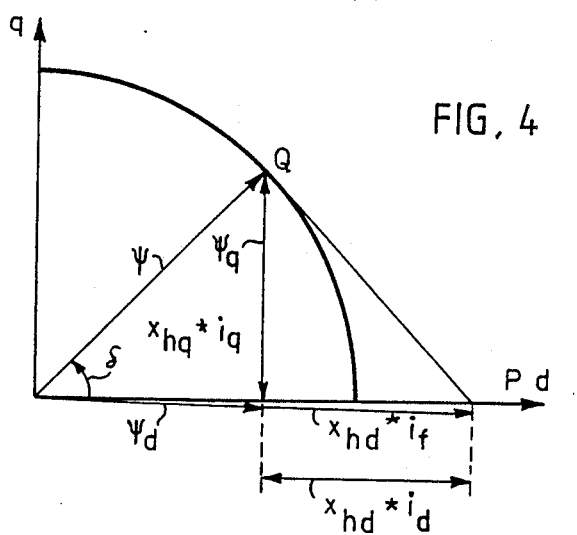
FIG. 4 is a phasor diagram illustrating the interrelation between the currents and fluxes in the synchronous machine.

The thus formed $i_{f0}$ set value in relation to the $i_{do}$ set value fixes the machine at the direct axis value $\psi_d$ (FIG. 4).

The control/adjustment of the torque determines the set value $i_{do}$. The assertion for the torque generated by the machine is $$Te = \psi_d \cdot i_q - \psi_q \cdot i_d.$$

The set value $i_{do}$ will then be the following:

$$i_{do} \text{ set value} = \frac{-Te \text{ set value} + \psi_d \cdot i_{qo} \text{ set value}}{\psi_q}$$

The desired quadrature flux for the machine and the corresponding quadrature current set value fixing the quadrature flux is $$\psi_q = \psi \cdot \sin\delta_r = (X_{hq} + X_{1\sigma}) i_{q0} \tag{15}$$

$$i_{q0} \text{ set value} = \psi \text{ set value} \cdot \sin\delta_r/(X_{hq} + X_{1\sigma}) \tag{16}$$

When the current set values are thus determined, the torque is generated by compensated $i_{fo} - i_{do}$ control without the main flux of the machine being varied (point Q fixed; FIG. 4).

When the machine is driven with low torques, a variable pole angle dependent on the load may be used instead of a constant pole angle to minimize thermal stress at the converters; in that case the maximum value of the pole angle is limited to the most advantageous value, that is, $\delta_r$ in equations (13), (14) and (15) is dependent on the required torque. The pole angle obtained from a flux calculator (FIG. 3) via a limiting block may also be used as a "limited" pole angle. In this case, with the increase of the torque the above stated set value $i_2$ calculated by the torque control/regulating device is actually the main current set value for the machine when $\delta \leq \delta_{max}$, and when $|\delta| = \delta_{max}$ has been reached, the required additional torque may be produced with a compensated $i_f - i_d$ control in such a manner that the quadrature axis flux is fixed by means of a fixed $i_{qo}$ control without the flux or pole angle being altered.

The rotor-oriented current set values are obtained from the set value $i_2$ as follows:

$$i_{d0} \text{ set value} = -i_{2 \text{ set value}} \cdot \sin\delta_r, |\delta_r| \leq \delta_{max} \tag{17.1}$$

$$i_{q0} \text{ set value} = +i_{2 \text{ set value}} \cdot \cos\delta_r, |\delta_r| \leq \delta_{max} \tag{17.2}$$

Further, the excitation current set value is formed in a compensated manner by means of the $i_{fo} - i_{do}$ control in accordance with equation (14). When the machine is controlled in this way, the increase in the $i_2$ set value—when the limited pole angle has been reached—may produce a greater quadrature flux than allowed for by the flux set value and the pole angle $\delta_r$. For this reason, the $i_{qo}$ set value is brought to the limiting block, and the set value derived therefrom will not exceed the value corresponding to the greatest allowed quadrature flux. The rise speed of the torque (torque impacts from small initial torques) may be improved in a machine provided with a damper winding by taking into account the current $i_{2Q}$ induced in the damper winding (equation 6) in the limiting of the quadrature flux as follows:

$$\psi_q = \psi \sin\delta = (X_{hq} + X_{1\sigma}) i_q + X_{hq} \cdot i_{2Q} \qquad (18)$$

i.e.

$$/i_q \text{ set value}/ \leq \frac{\psi \text{ set value} \cdot \sin \delta_{max} - X_{hq} \cdot i_{2Q}}{(X_{hq} + X_{1\sigma})} \qquad (19)$$

Thus, in this control method the quadrature axis damper winding serves as a "dynamic" compensator for the quadrature stator current similarly as the $i_{fo} - i_{do}$ control on the direct axis.

If the drive requires precise control of the flux (current), the stator current of the machine may be utilized for the precision adjustment of the flux.

Figure 3:
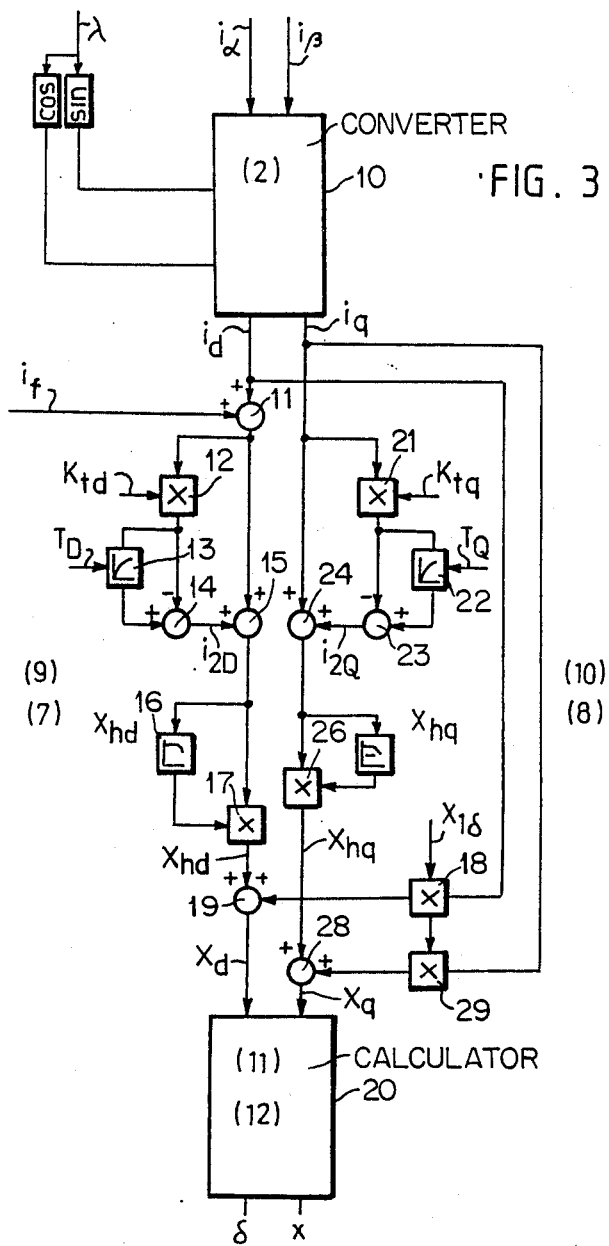
FIG. 3 presents the flux model of the synchronous machine.

In the block diagram of an exemplary flux model of the synchronous machine shown in FIG. 3, the flux ($\psi$) and pole angle ($\delta$) are calculated from the measured two-phase currents ($i_\alpha$, $i_\beta$) of the stator and from the measured position ($\lambda$) of the rotor in accordance with a technique known to the art.

The two-phase components ($i_\alpha$, $i_\beta$) in the current are converted by means of the position information ($\lambda$) into biaxial components ($i_d$, $i_q$) in the rotor coordinates by current converter 10 using the conversion equations (2).

The following description pertains to the determination of the direct flux ($\psi_d$). The direct stator current ($i_d$) and pole winding current, i.e. excitation current ($i_f$), are summed by summer circuit 11. The output of summer circuit is multiplied by coefficient $k_{td}$ in multiplier circuit 12, and the resultant output is input to the negative input of summer circuit 14 and to the input of function generator circuit 13 containing the time constant $T_D$, which is the direct damping time constant. Coefficient $k_{td}$ takes into account the stray reactance of the damper winding. The formulae for these constants are presented in equations (7) and (9). The expression for the damper winding is shown by equation (5). The output of function generator circuit 13 is input to summer circuit 14 where the output of multiplier circuit 12 is subtracted therefrom to obtain the direct damper winding current ($i_{2D}$). The sum current ($i_d + i_f + i_{2D}$) is obtained from summer circuit 15 and is the magnetomotive force of the direct axis. The direct main flux ($\psi_{hd}$) is obtained by multiplying the direct main reactance ($\psi_{hd}$), read from a reactance table 16, by the magnetomotive force of the direct axis in multiplier 17. The direct stator flux ($\psi_d$) is obtained by summing with the main flux ($\psi_{hd}$) the stray flux in summing circuit 19. The stray flux is the product of the direct stator current ($i_d$) and the stator stray reactance ($\psi_{1\delta}$) as obtained from multiplier circuit 18.

In the determination of the quadrature flux ($\psi_q$), there is needed, in addition to the quadrature stator current ($i_q$), the quadrature damper winding current ($i_{2Q}$), which is calculated from the quadrature stator current as follows. The quadrature stator current ($i_q$) is multiplied by coefficient $k_{tq}$, which takes into account the stray reactance of the damper winding, in multiplier 21 and input into summer circuit 23 along with the output of function generator 22 to obtain the quadrature damper winding current ($i_{2Q}$). The time constant $T_Q$ is the quadrature damping time constant. The formulae for these coefficients are presented in equations (8) and (10). The expression for the damper winding current is found in equation (6). The summed current ($i_q + i_{2Q}$) is the magnetomotive force of the quadrature axis. The quadrature main flux ($\psi_{hq}$) is obtained by multiplying the quadrature main reactance ($\psi_{hg}$), obtained from a reactance table 25, by multiplier 26. The quadrature stator flux ($\psi_q$) is obtained by summing the quadrature main flux ($\psi_{hq}$) the stray stator flux in summer circuit 28. The stray stator flux is the product of the quadrature stator current ($i_q$) and the stray stator reactance ($\psi_{1\delta}$) obtained by multiplier 29.

The pole angle ($\delta$) and the flux ($\psi$) of the machine are calculated in calculator unit 20 from the flux components ($\psi_d$, $\psi_q$) by means of equations (11) and (12).

We claim:

1. A method for controlling the torque of a synchronous machine supplied by a frequency converter and having a rotor winding with separately controlled excitation current, wherein starting from measured variables ($i_R$, $i_S$, $i_T$, $i_f$) representing the state of the machine, the direct axis flux component ($\psi_d$), the quadrature axis flux component ($\psi_q$) and the pole angle ($\delta$) for the machine are determined, and set values are produced for the flux ($\psi$ set value), excitation current ($i_{fo}$ set value) and current building the torque ($i_2$ set value), comprising the steps of:

forming from the calculated pole angle ($\delta$) by means of a limiting block a limited pole angle ($\delta_r$) that equals the pole angle ($\delta$) if the pole angle has an absolute value smaller than a separately adjustable limit ($\delta_{max}$), but equals the limit ($\delta_{max}$) if the pole angle has an absolute value equal to or greater than the limit ($\delta_{max}$);

projecting the set value ($i_2$ set value) of the current controlling the torque, being perpendicular to the direction forming the limited pole angle ($\delta_r$) with the direct axis (d) of the rotor, as the set value for the direct axis stator current ($i_{do}$ set value) and as the set value for the quadrature axis stator current ($i_{qo}$ set value); and calculating in order to maintain the direct flux ($\psi_d$) at a value corresponding to the limited pole angle ($\delta_r$) and the flux set value ($\psi$ set value), the set value for the excitation current ($i_{fo}$ set value) on the basis of the limited pole angle ($\delta_r$), the flux set value ($\psi$ set value) and the set value for the direct stator current ($i_{do}$ set value) so that the set value for the excitation current ($i_{fo}$ set value) compensates for the direct stator set value ($i_{do}$ set value).

2. A method as claimed in claim 1, further comprising limiting the set value for the quadrature stator current ($i_{qo}$ set value) to that quadrature current value ($i_{qoR}$) which in the stationary state generates a quadrature flux ($\psi_q$) corresponding to the flux set value ($\psi$ set value) and the greatest allowable pole angle ($\delta_{max}$) in the machine.

3. A method as claimed in claim 1 for a synchronous machine provided with a damper winding and a computer calculating the quadrature current ($i_{2Q}$) of the damper winding, further comprising limiting the set value for the quadrature stator current ($i_{qo}$ set value) to that quadrature current value ($i_{qoR}$) which together with the calculated quadrature damper winding current ($i_{2q}$) produces a quadrature flux ($\psi_q$) corresponding to the flux set value ($\psi$ set value) and the greatest allowable pole angle ($\delta_{max}$) in the machine.

4. A method for controlling the torque of a synchronous machine supplied by a frequency converter and having a rotor winding with separately controlled excitation current, wherein starting from measured variables ($i_R$, $i_S$, $i_T$, $i_f$) representing the state of the machine the direct axis flux component ($\psi_d$), the quadrature flux component ($\psi_q$) and the pole angle ($\delta$) for the machine are determined, and the set values are produced for the flux ($\psi$ set value), excitation current ($i_{fo}$ set value) and current controlling the torque ($i_2$ set value), comprising the steps of:

adjusting the pole angle ($\delta$) of the machine to a fixed (but freely selectable) value ($\delta_o$);

projecting the set value for the current building the torque ($i_2$ set value), being perpendicular to the direction forming said fixed pole angle ($\delta_o$) with the direct axis (d) of the rotor, as the set value for the direct axis stator current ($i_{do}$ set value) and as the set value for the quadrature stator current ($i_{qo}$ set value); adjusting the set value for the quadrature stator current ($i_{qo}$ set value) to a value corresponding to the quadrature flux ($\psi_q$) obtained on the basis of the flux set value ($\psi$ set value) and said fixed pole angle ($\delta_o$); and calculating in order to maintain the direct flux ($\psi_d$) at a value corresponding to the limited pole angle ($\delta_o$) and the flux set value ($\psi$ set value), the set value for the excitation current ($i_{fo}$ set value) on the basis of said fixed pole angle ($\delta_o$), flux set value ($\psi$ set value) and set value for the direct stator current ($i_{do}$ set value) so that the set value for the excitation current ($i_{fo}$ set value) compensates for the set value for the direct axis current ($i_{do}$ set value).

5. A method as claimed in claim 1 for controlling the torque of a synchronous machine, further comprising a closed regulation system for the magnetic flux of the machine, wherein the flux ($\psi$) of the machine is compared with the set value for the flux ($\psi$ set value) and wherein the difference between the set value and actual value of the flux is directed to a flux regulating block of the P or PI type, comprising the steps of projecting the output signal of the flux regulating block, having the direction of the straight line forming the limited ($\delta_p$) or controlled pole angle ($\delta_o$) with the direct axis (d) of the machine, as additional set values for the stator current on the direct axis ($\Delta i_d$ set value) and on the quadrature axis ($\Delta i_q$ set value); and using as the ultimate stator current set values either merely the set values ($i_{do}$ set value, $i_{qo}$ set value) produced by the torque/pole angle control or, on the direct axis, the sum of the set values produced by the torque/pole angle control and the flux control ($i_{do}$ set value, $\Delta i_d$ set value) and, on the quadrature axis, the sum of the set values produced by the torque/pole angle control and the flux control ($i_{qo}$ set value, $\Delta i_q$ set value).

6. A method as claimed in claim 2 for controlling the torque of a synchronous machine, further comprising a closed regulation system for the magnetic flux of the machine, wherein the flux ($\psi$) of the machine is compared with the set value for the flux ($\psi$ set value) and wherein the difference between the set value and actual value of the flux is directed to a flux regulating block of the P or PI type, comprising the steps of projecting the output signal of the flux regulating block, having the direction of the straight line forming the limited ($\delta_r$) or controlled pole angle ($\delta_o$) with the direct axis (d) of the machine, as additional set values for the stator current on the direct axis ($\Delta i_d$ set value) and on the quadrature axis ($\Delta i_q$ set value); and using as the ultimate stator current set values either merely the set values ($i_{do}$ set value, $i_{qo}$ set value) produced by the torque/pole angle control or, on the direct axis, the sum of the set values produced by the torque/pole angle control and the flux control ($i_{do}$ set value, $\Delta i_d$ set value) and, on the quadrature axis, the sum of the set values produced by the torque/pole angle control and the flux control ($i_{qo}$ set value, $\Delta i_q$ set value).

7. A method as claimed in claim 2 for controlling the torque of a synchronous machine, further comprising a closed regulation system for the magnetic flux of the machine, wherein the flux ($\psi$) of the machine is compared with the set value for the flux ($\psi$ set value) and wherein the difference between the set value and actual value of the flux is directed to a flux regulating block of the P or PI type, comprising the steps of projecting the output signal of the flux regulating block, having the direction of the straight line forming the limited ($\delta_r$) or controlled pole angle ($\delta_o$) with the direct axis (d) of the machine, as additional set values for the stator current on the direct axis ($\Delta i_d$ set value) and on the quadrature axis ($\Delta i_q$ set value); and using as the ultimate stator current set values either merely the set values ($i_{do}$ set value, $i_{qo}$ set value) produced by the torque/pole angle control or, on the direct axis, the sum of the set values produced by the torque/pole angle control and the flux control ($i_{do}$ set value, $\Delta i_d$ set value) and, on the quadrature axis, the sum of the set values produced by the torque/pole angle control and the flux control ($i_{qo}$ set value, $\Delta i_q$ set value).

* * * * *